(12) United States Patent
Wann et al.

(10) Patent No.: US 12,223,383 B2
(45) Date of Patent: Feb. 11, 2025

(54) SMART FOOD PAN SYSTEM

(71) Applicant: Duke Manufacturing Co., St. Louis, MO (US)

(72) Inventors: Benjamin Kingbay Wann, St. Louis, MO (US); Gregory Glen Stettes, St. Louis, MO (US); John Sweaney, St. Louis, MO (US); Jason Smith, St. Louis, MO (US)

(73) Assignee: DUKE MANUFACTURING CO., St. Louis, MO (US)

( * ) Notice: Subject to any disclaimer, the term of this patent is extended or adjusted under 35 U.S.C. 154(b) by 0 days.

(21) Appl. No.: 18/472,318

(22) Filed: Sep. 22, 2023

(65) Prior Publication Data

US 2024/0086656 A1     Mar. 14, 2024

Related U.S. Application Data

(63) Continuation-in-part of application No. 18/174,044, filed on Feb. 24, 2023, which is a continuation-in-part of application No. 17/906,096, filed as application No. PCT/US2021/022925 on Mar. 18, 2021, application No. 18/472,318 is a continuation-in-part of application No. 17/906,096, filed as application No. PCT/US2021/022925 on Mar. 18, 2021.

(60) Provisional application No. 63/376,835, filed on Sep. 23, 2022, provisional application No. 63/313,370, filed on Feb. 24, 2022, provisional application No. 62/991,248, filed on Mar. 18, 2020.

(51) Int. Cl.
*G06K 7/10*     (2006.01)

(52) U.S. Cl.
CPC .............................. *G06K 7/10366* (2013.01)

(58) Field of Classification Search
CPC .. G06K 7/10009; G06K 7/10366; G06K 7/10; G06K 7/10297; G06K 7/10425; A47J 39/006
See application file for complete search history.

(56) References Cited

U.S. PATENT DOCUMENTS

| | | | |
|---|---|---|---|
| 5,798,694 A | 8/1998 | Reber et al. | |
| 6,104,966 A | 8/2000 | Haagensen | |
| 6,600,418 B2 | 7/2003 | Francis et al. | |
| 7,116,230 B2 | 10/2006 | Klowak | |
| 7,132,926 B2 | 11/2006 | Vaseloff et al. | |

(Continued)

FOREIGN PATENT DOCUMENTS

| | | |
|---|---|---|
| CN | 203084467 U | 7/2013 |
| CN | 104134087 A | 11/2014 |

(Continued)

OTHER PUBLICATIONS

International Search Report and Written Opinion, PCT Application No. PCT/US23/33370, 11 pages, Dec. 18, 2023.

(Continued)

*Primary Examiner* — Laura A Gudorf
(74) *Attorney, Agent, or Firm* — Stinson LLP

(57) ABSTRACT

A smart pan system comprising a food pan having one or more radio frequency tag coupled thereto that store a unique identifier associated with the food pan. A tag reader associated with a food preparation apparatus reads the unique identifier for linking to information relating to the food carried in the pan.

23 Claims, 6 Drawing Sheets

(56) References Cited

U.S. PATENT DOCUMENTS

| | | |
|---|---|---|
| 7,258,064 B2 | 8/2007 | Vaseloff et al. |
| 7,411,502 B2 | 8/2008 | Collins et al. |
| 7,474,210 B2 | 1/2009 | Roberts et al. |
| 7,525,434 B2 | 4/2009 | Batra |
| 7,628,107 B2 | 12/2009 | Vaseloff et al. |
| 7,650,833 B2 | 1/2010 | Pardoe et al. |
| 7,905,173 B2 | 3/2011 | Sus et al. |
| 7,922,961 B2 | 4/2011 | Chisholm et al. |
| 7,973,642 B2 | 7/2011 | Schackmuth et al. |
| 8,102,264 B2 | 1/2012 | Rinkes et al. |
| 8,164,457 B2 | 4/2012 | Dunlap et al. |
| 8,228,200 B2 | 7/2012 | Kolton et al. |
| 8,416,080 B2 | 4/2013 | Higham |
| 8,695,489 B2 | 4/2014 | Ewald et al. |
| 8,786,443 B2 | 7/2014 | Selgrath et al. |
| 8,844,814 B2 | 9/2014 | Chang et al. |
| 9,000,896 B1 | 4/2015 | Kim et al. |
| 9,176,832 B2 | 11/2015 | Vasseur et al. |
| 9,193,535 B2 | 11/2015 | Tanaka |
| 9,288,612 B2 | 3/2016 | Locker et al. |
| 9,445,625 B2 | 9/2016 | Burkett et al. |
| 9,487,322 B2 | 11/2016 | Wilkinson |
| 9,746,842 B2 | 8/2017 | Reese et al. |
| 9,798,987 B2 | 10/2017 | Chapman et al. |
| 9,917,903 B2 | 3/2018 | Clernon |
| 9,965,734 B2 | 5/2018 | Chapman, III et al. |
| 9,974,015 B2 | 5/2018 | Zakaria et al. |
| 9,977,928 B2 | 5/2018 | Sehmer et al. |
| 10,079,691 B2 | 9/2018 | Christopher et al. |
| 10,111,070 B2 | 10/2018 | Zakaria et al. |
| 10,111,071 B2 | 10/2018 | Polo et al. |
| 10,304,020 B2 | 5/2019 | Chapman, III et al. |
| 10,426,282 B1 | 10/2019 | Hamilton |
| 10,440,546 B2 | 10/2019 | Polo et al. |
| 10,546,161 B2 | 1/2020 | Sehmer et al. |
| 10,735,261 B2 | 8/2020 | Pillai |
| 10,839,170 B2 | 11/2020 | Sehmer et al. |
| 10,841,874 B2 | 11/2020 | Zakaria et al. |
| 10,848,567 B1 | 11/2020 | Von Muenster et al. |
| 10,863,234 B2 | 12/2020 | Jabara et al. |
| 10,932,107 B2 | 2/2021 | Bae et al. |
| 10,951,435 B2 | 3/2021 | Jakobsson |
| 11,023,851 B2 | 6/2021 | Schoening |
| 11,080,482 B2 | 8/2021 | Donati et al. |
| 11,082,837 B2 | 8/2021 | Zavesky et al. |
| 11,105,909 B2 | 8/2021 | Argentieri et al. |
| 11,124,367 B2 | 9/2021 | Moore et al. |
| 11,128,486 B2 | 9/2021 | Yang et al. |
| 11,176,515 B2 | 11/2021 | Godlewski |
| 2002/0018705 A1 | 2/2002 | Kawaguchi |
| 2005/0211775 A1 | 9/2005 | Vaseloff et al. |
| 2006/0085266 A1 | 4/2006 | Wei et al. |
| 2007/0144202 A1 | 6/2007 | Theodos et al. |
| 2007/0251521 A1 | 11/2007 | Schackmuth et al. |
| 2007/0251667 A1 | 11/2007 | Ewald et al. |
| 2009/0014279 A1 | 1/2009 | Bouetard |
| 2009/0266736 A1 | 10/2009 | Sprishen et al. |
| 2012/0032524 A1 | 2/2012 | Baarman et al. |
| 2012/0323392 A1 | 12/2012 | Gerdes et al. |
| 2016/0019451 A1 | 1/2016 | Selgrath et al. |
| 2017/0041861 A1 | 2/2017 | Fuhrmann |
| 2017/0071411 A1 | 3/2017 | Veltrop et al. |
| 2017/0071412 A1 | 3/2017 | Veltrop et al. |
| 2017/0134255 A1 | 5/2017 | Amini et al. |
| 2017/0290466 A1 | 10/2017 | Lundberg et al. |
| 2018/0048481 A1 | 2/2018 | Wann et al. |
| 2018/0081331 A1 | 3/2018 | Gary, Jr. et al. |
| 2019/0075970 A1 | 3/2019 | Patterson et al. |
| 2019/0095663 A1 | 3/2019 | Ayette |
| 2019/0125120 A1 | 5/2019 | Jenkins et al. |
| 2019/0339686 A1 | 11/2019 | Cella et al. |
| 2020/0048009 A1 | 2/2020 | Moore et al. |
| 2020/0074522 A1 | 3/2020 | Balasubramanian et al. |
| 2020/0146504 A1 | 5/2020 | Patterson |
| 2020/0213101 A1 | 7/2020 | Zimmerman et al. |
| 2020/0349544 A1 | 11/2020 | Perarnau Pradell |
| 2020/0349795 A1 | 11/2020 | Wann et al. |
| 2021/0125142 A1 | 4/2021 | Bloom et al. |
| 2021/0127251 A1 | 4/2021 | Kang et al. |
| 2021/0216953 A1 | 7/2021 | Ramos |
| 2021/0352764 A1 | 11/2021 | Hamlin et al. |

FOREIGN PATENT DOCUMENTS

| | | | |
|---|---|---|---|
| CN | 109358535 A | | 2/2019 |
| CN | 109890065 A | * | 6/2019 |
| CN | 110392445 A | | 10/2019 |
| CN | 111010324 A | | 4/2020 |
| CN | 111090243 A | | 5/2020 |
| CN | 111263338 A | | 6/2020 |
| CN | 112217694 A | | 1/2021 |
| CN | 112261631 A | | 1/2021 |
| FR | 2885435 A1 | | 11/2006 |
| KR | 2012129043 A | | 11/2012 |
| MX | 2019004073 A | | 11/2019 |
| TW | M388892 U | | 9/2010 |
| TW | 201626767 A | | 7/2016 |
| WO | 2007042248 A1 | | 4/2007 |
| WO | 2012/121616 A1 | | 9/2012 |
| WO | 2012/152293 A1 | | 11/2012 |
| WO | 2019/100014 A1 | | 5/2019 |
| WO | 2021/134562 A1 | | 8/2021 |
| WO | 2021/188775 A1 | | 9/2021 |

OTHER PUBLICATIONS

RFID Reader User Manual Rev 1.0, User Manual RFID Reader Board (Welbilt), 14 pages (No date available).

Sandeep, Manasa et al., Implementation of Iot Based Smart Cooking Environment, pp. 192-195 (2019) 1st International Conference on Advanced Technologies in Intelligent Control, Environment, Computing & Communication Engineering (ICATIECE) (Mar. 19, 2019).

* cited by examiner

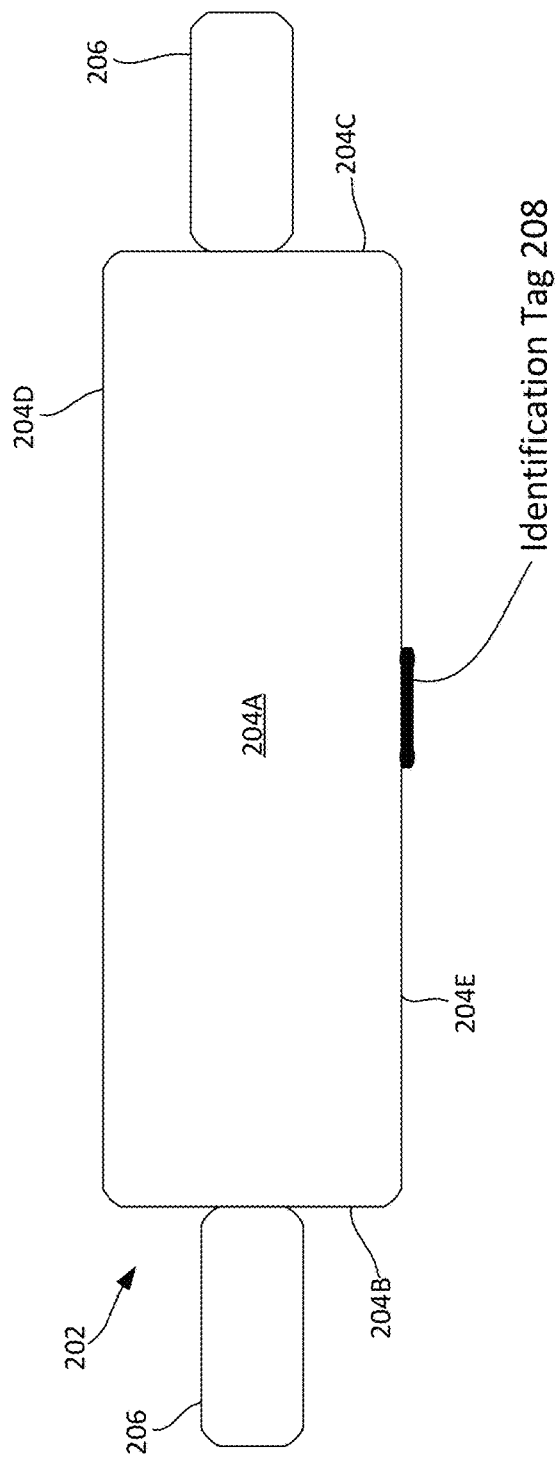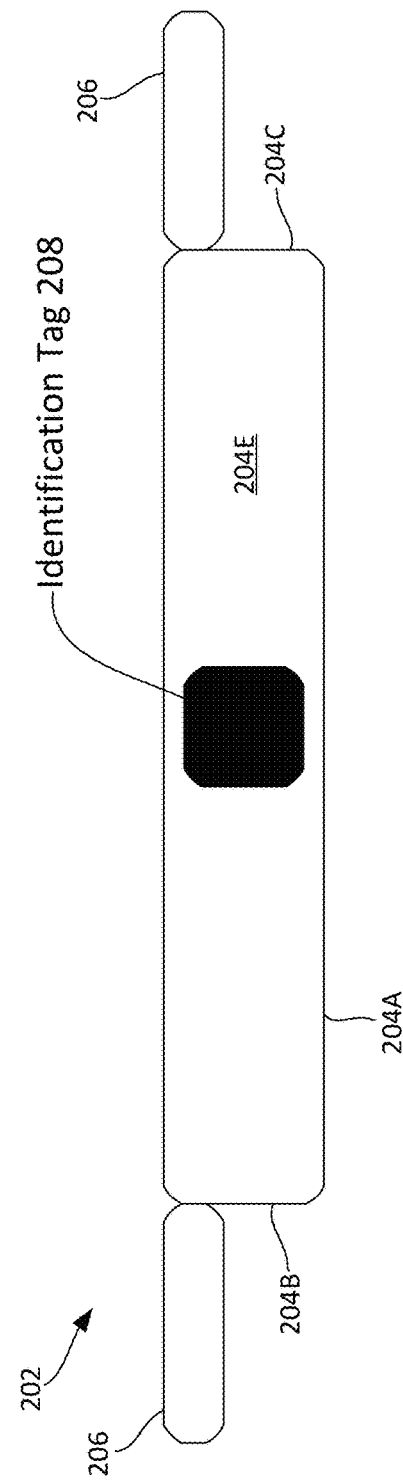

SMART FOOD PAN SYSTEM

CROSS-REFERENCE TO RELATED APPLICATIONS

This application claims priority to U.S. Provisional Patent Application No. 63/376,835 filed Sep. 23, 2022.

This application is a continuation-in-part of U.S. patent application Ser. No. 18/174,044 filed Feb. 24, 2023, which claims priority to U.S. Provisional Patent Application No. 63/313,370 filed Feb. 24, 2022 and is a continuation-in-part of U.S. patent application Ser. No. 17/906,096 filed Sep. 12, 2022, which is a U.S. national stage application of International Application No. PCT/US2021/022925 filed Mar. 18, 2021, which claims priority to U.S. Provisional Patent Application No. 62/991,248 filed Mar. 18, 2020.

This application is a continuation-in-part of U.S. patent application Ser. No. 17/906,096 filed Sep. 12, 2022, which is a U.S. national stage application of International Application No. PCT/US2021/022925 filed Mar. 18, 2021, which claims priority to U.S. Provisional Patent Application No. 62/991,248 filed Mar. 18, 2020.

The entire disclosures of the foregoing are incorporated herein by reference.

BACKGROUND

The present disclosure generally relates to a smart food pan system, and more particularly to a smart food pan system configured to communicate on a low power wireless mesh (e.g., Bluetooth mesh) kitchen network.

Food preparation establishments such as restaurants, including quick service or fast food restaurants, have kitchens including various food preparation apparatuses and food holding units. In the quick service food industry, large quantities of food are processed quickly. To efficiently serve customers, some food or portions thereof are precooked before an order for the food is entered. The precooked food is stored in a way to maintain desired properties of the food. For example, the food can be held in what is commonly referred to a food holding unit that can heat and/or cool food in the unit. Food can be temporarily held in pans stored in the unit prior to use in filling a customer order.

SUMMARY

In an aspect, a system comprises a food pan that has at least one radio frequency tag coupled to it. The tag stores a unique identifier associated with the food pan. The system also comprises at least one food preparation apparatus, which includes a tag reader configured to read the identifier from the tag when the tag is within range of the reader. The food preparation apparatus also includes a single board computer communicatively coupled to a wireless network. The single board computer comprises a processor and a memory device communicatively coupled to the processor. The memory device stores processor-executable instructions that, when executed, configure the processor to receive the identifier read from the tag by the tag reader, communicate the identifier on the network, and link the identifier to information relating to food carried in the pan.

In another a smart pan system comprises a food pan that has at least one radio frequency tag coupled to it. The tag stores a unique identifier associated with the food pan. The system also comprises one or more tag readers configured to read the identifier from the tag when the tag is within range of the readers. Each of the tag readers is associated with a food preparation apparatus communicatively coupled to a wireless network. The food preparation apparatus is configured to receive the identifier read from the tag by one of the tag readers, communicate the identifier on the network, and link the identifier to information relating to the food carried in the pan.

Other objects and features of the present invention will be in part apparent and in part pointed out herein.

BRIEF DESCRIPTION OF THE DRAWINGS

FIGS. 2A and 2B are top and side views, respectively, of a food pan having an identification tag coupled thereto for use in the kitchen network of FIG. 1.

Corresponding reference characters indicate corresponding parts throughout the drawings.

DETAILED DESCRIPTION

Figure 1:
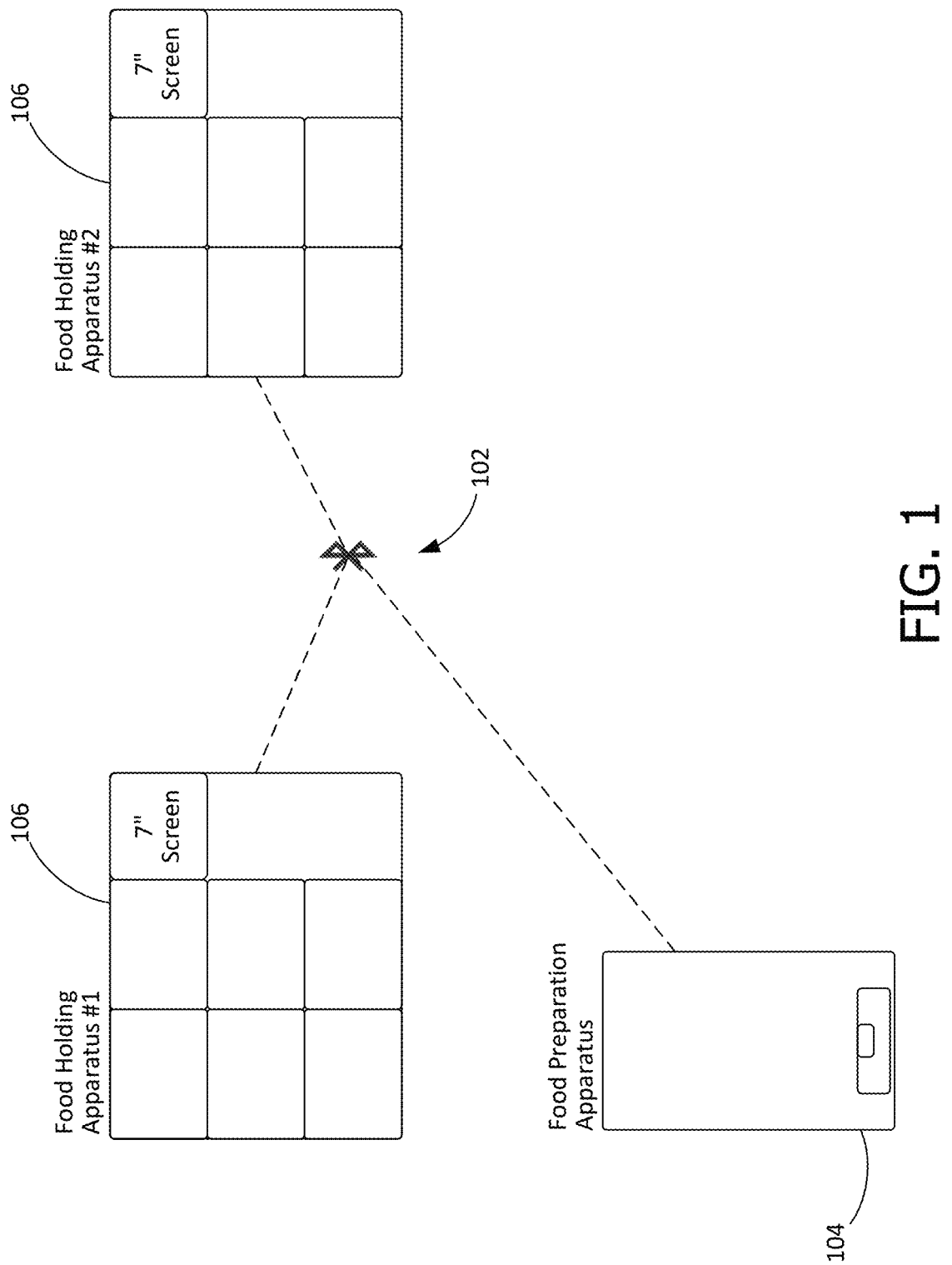
FIG. 1 illustrates an example kitchen network according to an embodiment.

FIG. 1 illustrates an overview of an example kitchen network embodying aspects of the present disclosure. As shown, a wireless communications network 102 allows the kitchen components to communicate with one another (e.g., share messages). In the illustrated embodiment, network 102 comprises a Bluetooth Low Energy (BLE) mesh network on which one or more food preparation apparatuses 104 and/or one or more food holding apparatuses 106 are nodes. For example, the food preparation apparatus 104 is a cooking apparatus for use with a smart pan (see FIGS. 2A, 2B) and is configured for sending a BLE mesh broadcast message to other mesh members (e.g., food holding apparatuses 106) when an event occurs. The food holding apparatuses 106 receive the BLE mesh message via the network 102. Those skilled in the art are familiar with mesh networks in which infrastructure nodes (e.g., bridges, switches, and other infrastructure devices) connect directly, dynamically, and non-hierarchically to as many other nodes as possible in a many-to-many relationship and cooperate with one another to efficiently route data from/to clients. Other types of wireless communication networks (e.g., WiFi, near-field communication (NFC), etc.) in addition to Bluetooth as shown are within the scope of the present disclosure.

The food preparation apparatus 104 and food holding apparatus 106, as well as a router (not shown) and a local computer (not shown), on the network 102 may be physically located within the same food preparation establishment, such as a restaurant or other commercial kitchen, including a quick service or "fast food" restaurant. In an embodiment, a plurality of food preparation apparatuses 104 and/or a plurality of food holding apparatuses 106 are communicatively coupled to the router and/or local computer via the network 102. The router is configured to communicatively couple food preparation apparatus 104, food holding apparatus 106, as well as the local computer on network 102 to an external communications network such as the Internet.

The food preparation apparatus 104 may include various food cooking devices. An example of one such cooking device is an oven, and it will be understood that other cooking devices, such as fryers, microwaves, conditioning cabinets (e.g. for dough, etc.), grills, and the like can be used without departing from the scope of the present invention. As explained below, a smart food pan system (see FIGS. 2A and 2B), permits accurate tracking of food throughout the kitchen, which is particularly beneficial to improve efficiency and food quality and to prevent cross-contamination of vegan and non-vegan food, gluten-free food and foods containing gluten, etc.

The food holding apparatus 106 of the present disclosure can be used to store various types of food. For example, food holding apparatus 106 can be used to store partially cooked or precooked food before serving the food to customers. The food holding apparatus 106 can be used to store the food to preserve desired properties of the food such as moisture, temperature, or texture (e.g., crispiness). The food holding apparatus 106 is adapted for holding food at a suitable temperature (e.g., cool temperature, ambient temperature, and/or warm temperature) such as refrigerated back counters (RBC), tri-channel cold pan counters, steam tables, infrared holding units, heat sink holding units, reach-in under-counter refrigerators or freezers (RUF), hot/cold/freeze or hot/cold/frost units, or other holding units, etc. Broadly, food preparation apparatuses include food holding apparatuses.

An example food pan 202 is shown in FIGS. 2A and 2B (not necessarily to scale). The food pan 202 includes a pan body comprising a bottom wall 204A, front and rear walls 204B, 204C, and left and right walls 204D, 204E. The pan body bounds an interior of the pan for holding food therein. In an embodiment, the pan 202 includes a pair of handles 206. Referring further to FIGS. 2A and 2B, a smart food pan system embodying aspects of the present disclosure uses identifier tags 208, such as radio frequency identification (RFID) tags, coupled to (e.g., mounted to, embedded in, adhered on) one or more plastic food pans 202 ("smart pans") for the purpose of tracking the food pan 202 and the food products contained therein through the life cycle of usage. In an embodiment, pan 202 comprises a pocket configured to receive tag 208. The pocket is then fused closed after tag 208 is inserted. Each identifier tag 208 is associated with (e.g., contains, stores, displays, etc.) a unique pan identifier (e.g., a serial number) for the smart pan 202. Preferably, tag 208 comprises an energy harvesting tag such as a passive RFID tag, a battery-free BLE tag, a battery-free NFC tag, etc.

In the embodiment of FIGS. 2A and 2B, the tag 208 is positioned at the geometric center of right wall 204E. In an alternative embodiment, an identical tag 208 is also positioned at the geometric center of left wall 204D so the direction in which pan 202 is inserted into a holding location of food holding apparatus 106 does not affect tracking. It is to be understood that various numbers and positions of tags 208 coupled to smart pan 202 are within the scope of the present disclosure.

In an embodiment, food holding apparatus 106 can accommodate a plurality of pans 202 stowable in food pan holding locations, or wells. Employees of a food service establishment (e.g., crew members) using food holding apparatus 106 will typically need to access food stored therein quickly and repeatedly. The food holding apparatus 106 is configured to facilitate efficient access to food stored therein. For example, a crew member can access a certain type of food held in a particular pan 202 by pulling the pan out like a drawer. The arrangement is such that when the pan 202 are pulled out like a drawer, the crew member can access the storage compartment of the pan for unloading and/or loading food and can return the pan back to the stowed position.

The food preparation apparatus registers the unique identifier of tag 208 associated with smart pan 202 and sends a broadcast message (e.g., BLE datagram broadcast message) to network 102 when an event relating to the pan occurs. For instance, the message informs the mesh that the particular pan 202 is in the system and network 102 then associates information about the food contained in the pan with the identifier. In other words, the smart pan ID and the accompanying food information is registered in network 102 before the pan 202 leaves food apparatus 104 and arrives at food holding apparatus 106.

Figure 3:
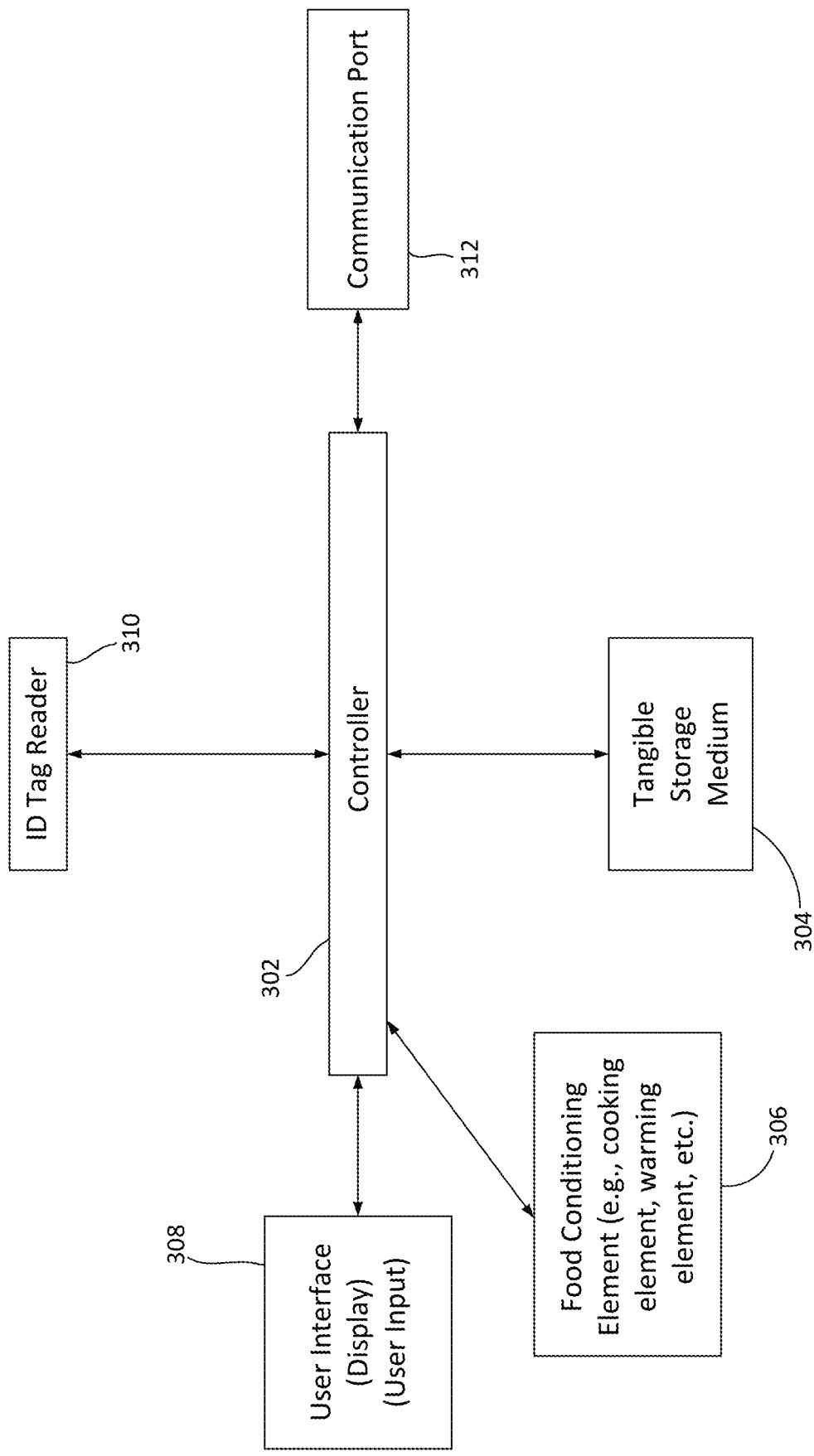
FIG. 3 is a block diagram of a control system for a food preparation or holding apparatus of the kitchen network of FIG. 1.

FIG. 3 illustrates an example control system for use with food preparation apparatus 104 and/or food holding apparatus 106 for tracking food pan 202. It is to be understood that the control system may be located within the apparatus or external thereto. The control system comprises a controller 302 that executes processor-executable instructions stored on a tangible storage medium 304. When executed, the instructions configure the controller 302 to not only control operation of a food conditioning element 306 of the respective food preparation apparatus 104 and/or food holding apparatus 106 but also generate a user interface 308 to display information and receive user input from a crew member. The controller 302 also cooperates with a tag reader, or scanner, 310 (e.g., RFID reader) for reading identifier information from tag 208 such that the food information for the pan 202 to which the particular tag is coupled can be associated with the identifier. According to aspects of the present disclosure, controller 302 communicates messages pertaining to smart pan 202 to the network 102 via a communication port 312.

Figure 4:
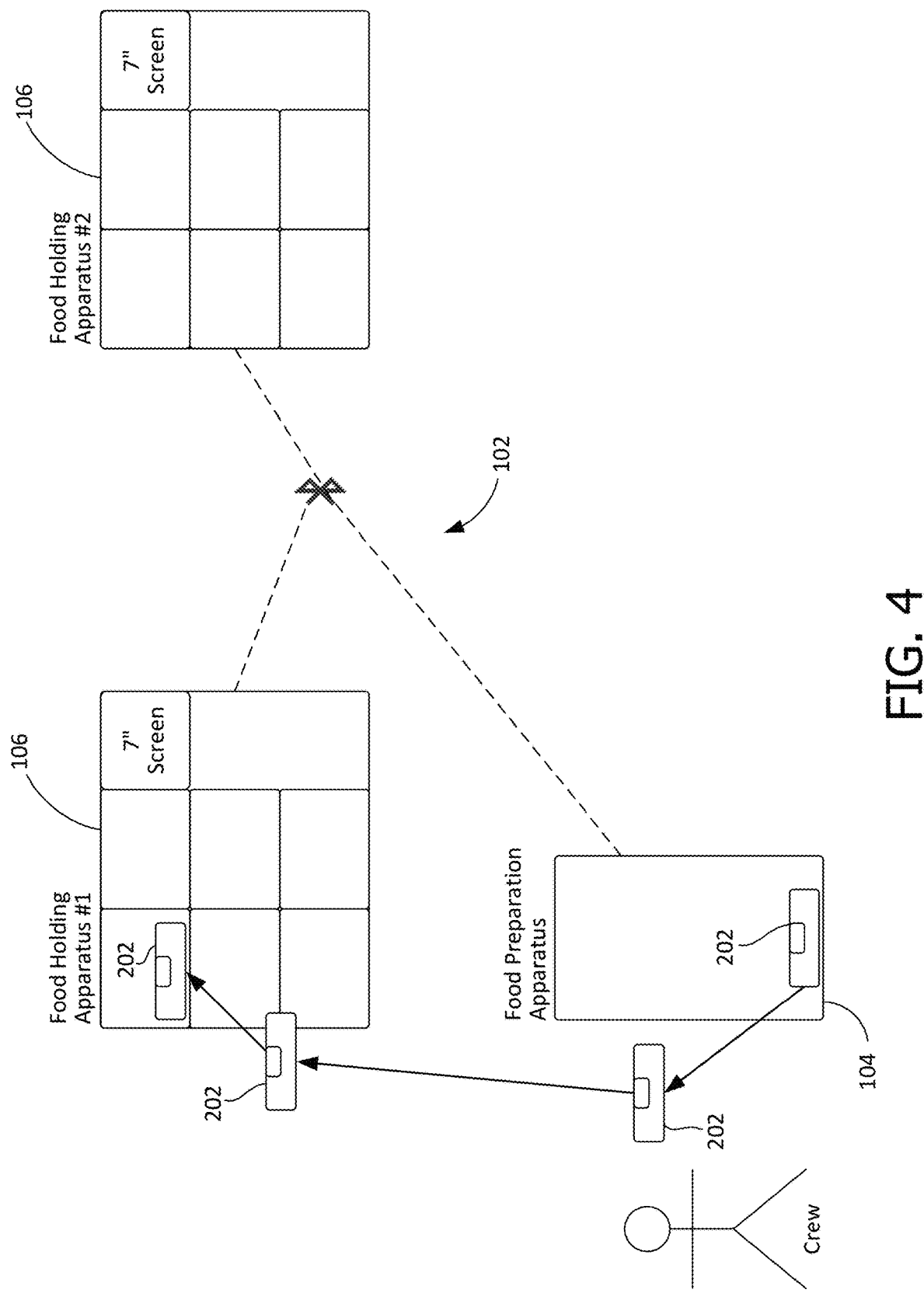
FIGS. 4 and 5 illustrate tracking movement of the pan of FIG. 2 within the kitchen network of FIG. 1.

FIG. 4 shows the flow of food in smart pans 202 from food origination at the food preparation apparatus 104 (e.g., oven, fryer, microwave, dough conditioning cabinets, grills, etc.) to the holding phase in the food holding apparatus 106 (e.g., food holding unit, steam table, infrared holding unit, heat sink holding unit, holding cabinets, etc.). Beginning at food preparation apparatus 104, smart pan 202 contains prepared food. The ID tag reader 310 of food preparation apparatus 104 reads the ID from the tag 208 coupled to the particular smart pan 202 for registering pan 202 on the network 102. The network 102 in turn links food data for the pan 202 and the registered ID. A crew member removes smart pan 202 from food preparation apparatus 104 and inserts it into, for example, food holding apparatus 106. As food holding apparatus 106 receives smart pan 202, the tag reader 310 of food holding apparatus 106 reads tag 208 and identifies which holding location (e.g., well) the pan 202 is linked to and correlates the network message (e.g., BLE mesh datagram) containing the food data sent earlier from food preparation apparatus 104. The food holding apparatus 106 uses the pan identifier to find the corresponding food information associated with the pan identifier (broadly, the smart pan 202). The food holding apparatus 106 uses the food information to perform some food holding operations such as adjust settings (e.g., change holding temperature) and/or display information (e.g., display remaining hold time).

Figure 5:
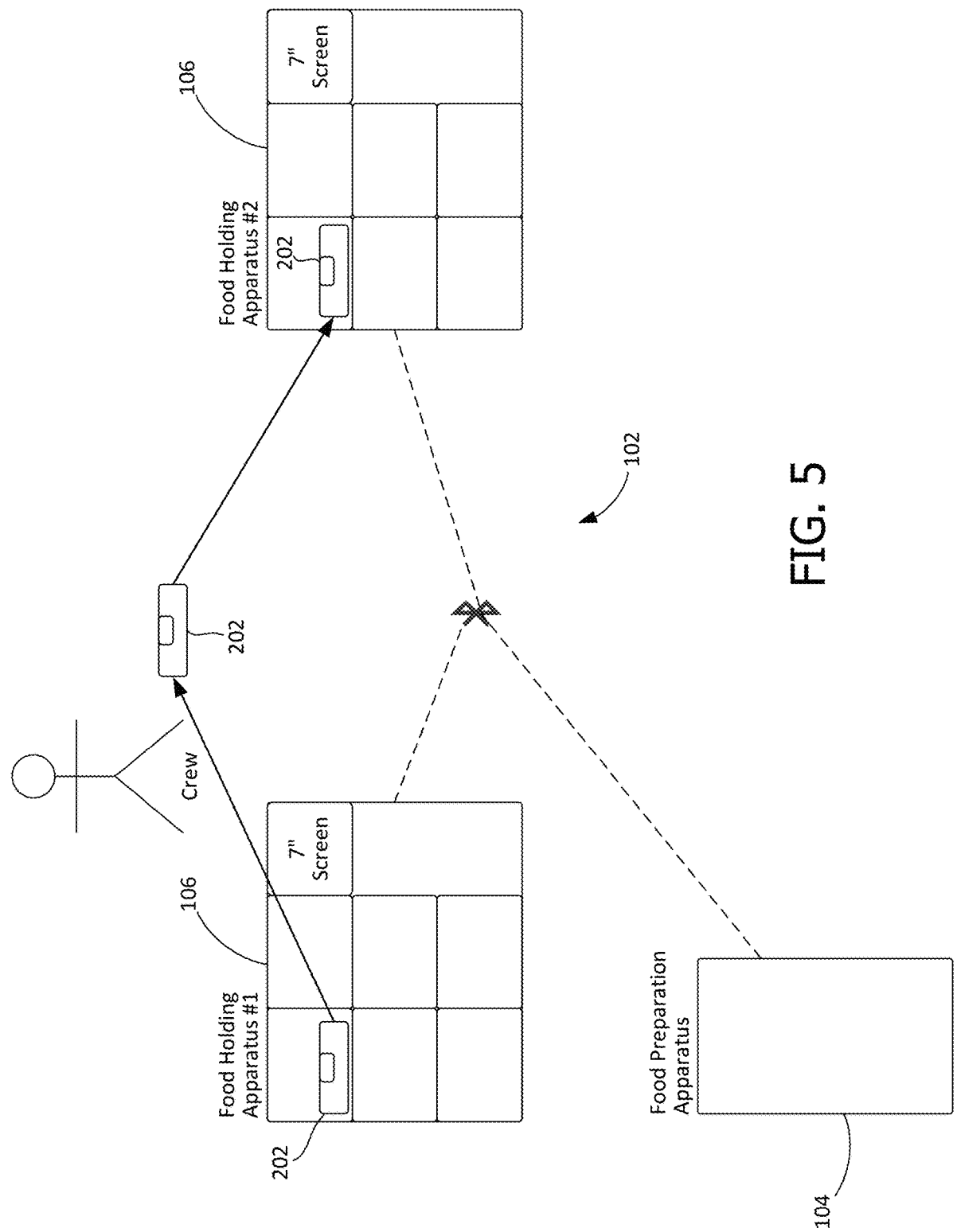

FIG. 5 further illustrates the smart pan 202 moving from one food holding apparatus 106 to another food holding apparatus 106. In this example, the crew member moves smart pan 202 from one food holding apparatus 106 (e.g., #1) to another food holding apparatus 106 (e.g., #2) and inserts the pan into one of its holding locations. Reading tag 208 by ID tag reader 310 triggers the broadcasting of data (e.g., BLE mesh data) on network 102. This allows for any number of capable food holding apparatuses 106 in a kitchen environment to be aware of the information. Food information for smart pan 202 is transferred as the pan moves from one food holding apparatus 106 (e.g., #1) to the other food holding apparatus 106 (e.g., #2) via the network data message (e.g., BLE mesh datagram) and correlated identifier (e.g., RFID trigger). The food data includes, but is not limited to: type, time of hold start, duration, time remaining, transfer start, cook finish, and original weight pan. In an embodiment, if the food data associated with smart pan 202 differs a programmed state of the target holding location of food holding apparatus 106, controller 302 is configured to dynamically change the holding settings to match the settings specified in the food data.

For example, ID tag reader 310 detects when smart pan 202 is in a holding location (e.g., well) of food holding apparatus 106 and associates the pan identifier from tag 208 to the data message. In an embodiment, reader 310 detects when smart pan 202 is in a well, and links the ID of the pan to a BLE mesh datagram. First-In-First-Out (FIFO) lights are used to determine which smart pan 202 should be used in what order by the crew. Time remaining on a transferred smart pan is included in a queue of the target food holding apparatus 106. As described above, if the food Information associated with the smart pan transfer differs from the existing or programmed state of the holding location of the target food holding apparatus 106 into which smart pan 202 is transferred, the food holding apparatus 106 automatically changes (broadly, a food holding operation) its holding settings (broadly, a food holding parameter) to match the food information associated with smart pan 202. Further to the example, if a holding location is currently at a holding temperature of 150 degrees F. (a food holding parameter) but the food information associated with smart pan 202 indicates the food in this particular pan is to be held at 170 degrees F., the controller 302 of food holding apparatus 106 automatically changes the holding temperature (a food holding operation) at the holding location to 170 degrees F., such as by operating a heating element 306.

The smart pan system of the present disclosure allows food pan information (e.g., food type, time of hold start, hold time duration, remaining hold time, transfer start time, cook finish time, original pan weight, initial food weight, pan identifier, etc.) relating to the smart pan 202 and/or the food held therein to be transferred between kitchen components (e.g., food preparation apparatuses 104, food holding apparatuses 106, etc.) of a kitchen network. The system also allows the kitchen components to automatically access and/or utilize the food pan information to perform an operation such as a food holding operation. For example, food holding apparatus 106 can automatically display the remaining hold time for the food after receiving smart pan 202 (holding the food) from food preparation apparatus 104 (which prepared or cooked the food). FIGS. 4 and 5 show how the food information is sent via the communication network 102 (e.g., a wired or wireless network) of the kitchen network and how the identification tags 208 of the smart pans 202 are used as a means of triggering physical actions. In this regard, the smart pan system provides a check on the physical actions of the crew member and ensures that food is prepared and held in the prescribed manner.

In an embodiment, one tag reader 310 is associated with each holding location of food holding apparatus 106 such that a tag signal is generated for each holding location in range. In an alternative embodiment, an antenna associated with each holding location of food holding apparatus 106 feeds a single tag reader 310 such that a tag signal is generated for each holding location in range. For example, the range of tag reader 310 is about 2-4 meters.

Figure 6:
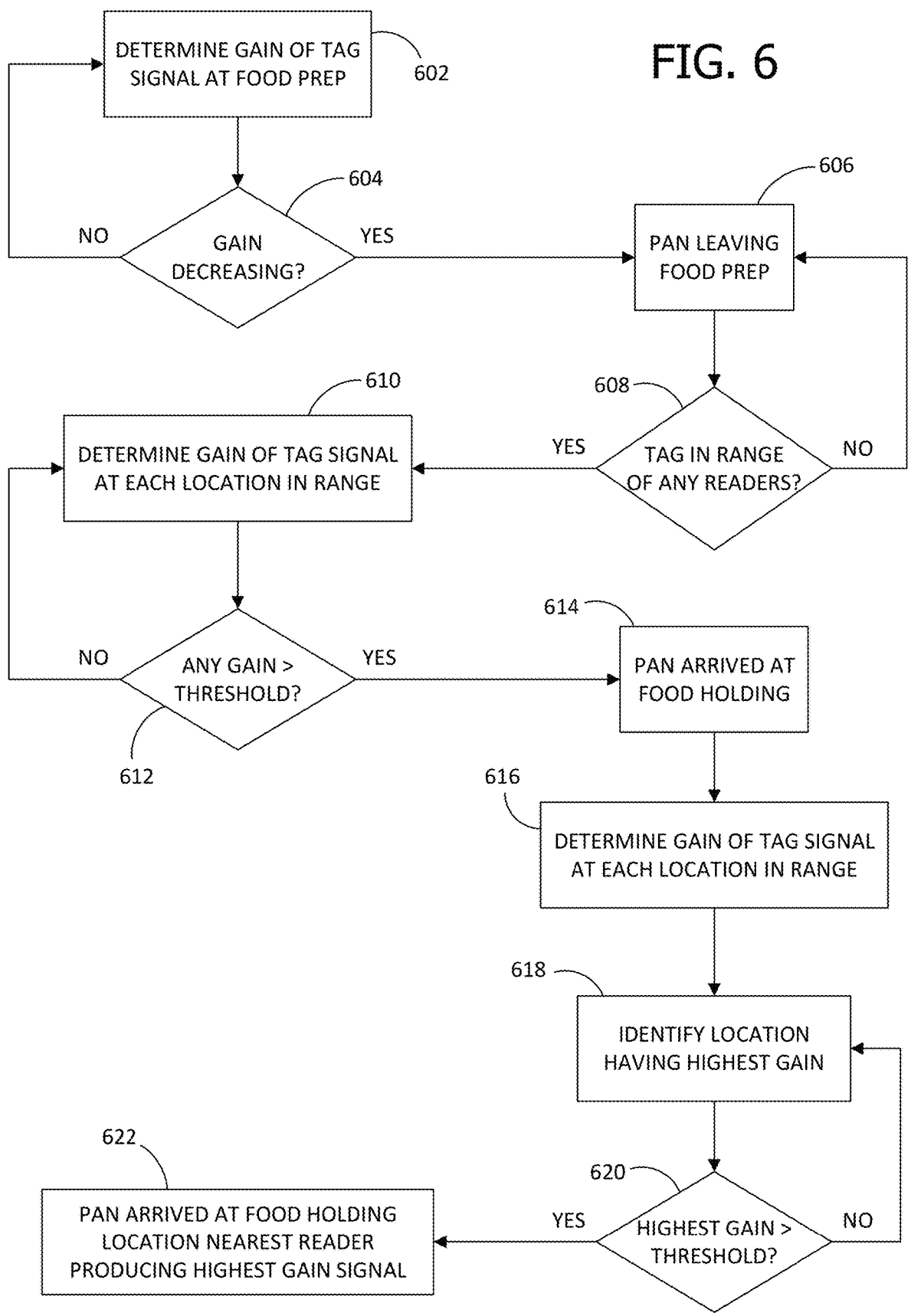
FIG. 6 is a flow diagram illustrating an example process for determining location of the pan of FIG. 2 within the food holding apparatus.

FIG. 6 is a flow diagram illustrating an example process for determining the position of pan 202 within food holding apparatus 106 based on the tag signals. Beginning at 602, controller 302 determines the gain of the tag signal read by tag reader 310. If the gain is decreasing, as determined at 604, controller 302 defines at 606 that pan 202 is leaving food preparation apparatus 104. On the other hand, if the gain of the tag signal read by tag reader 310 is not decreasing at 604, the process returns to 602. At 608, the process determines if tag 208 is within range of any other tag readers 310. If not, the process returns to 606. If so, controller 302 receives the tag signal from each tag reader 310 within range at 610, and determines the gain of each signal. The controller 302 compares, at 312, the gain of the tag signals from the in-range tag readers 310 to a threshold. Once the threshold has been met, controller 302 defines at 614 that smart pan 202 has arrived at a new location, such as food holding apparatus 106. At 616, controller 302 further determines the gain of the tag signal from each tag reader 310 within range and, at 618, identifies which tag reader 310 has the highest gain tag signal. The controller 302 compares, at 620, the highest gain tag signal to a threshold to determine, at 622, the specific location of smart pan 202 (e.g., a specific well of food holding apparatus 106).

Commonly assigned U.S. patent application Ser. No. 17/906,096, filed Sep. 12, 2022, the entire disclosure of which is incorporated herein by reference, discloses a kitchen network system.

Commonly assigned U.S. patent application Ser. No. 18/174,044, filed Feb. 24, 2023, the entire disclosure of which is incorporated by reference, discloses a food preparation apparatus configured to communicate on a low power wireless mesh (e.g., BLE mesh) network.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor (s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

What is claimed is:

1. A system comprising:
    a food pan configured for carrying food, the food pan having at least one radio frequency tag coupled thereto, the radio frequency tag storing a unique identifier associated with the food pan; and
    at least one food preparation apparatus, comprising:
        one or more tag readers configured to read the identifier from the tag and generate a tag signal when the tag is within range thereof; and
        a single board computer communicatively coupled to a wireless network, the network comprising a plurality of nodes, wherein the single board computer is one of the nodes of the network, the single board computer comprising:
            a processor, and
            one or more memory devices communicatively coupled to the processor, the memory devices storing processor-executable instructions that, when executed, configure the processor to:
                receive the tag signal, the tag signal including the identifier read from the tag by the one or more tag readers,
                communicate the identifier on the network,
                link the identifier to information relating to the food carried in the pan;
                measure a gain of the tag signal; and
                determine whether the food pan is nearing or leaving the one or more tag readers when the gain of the tag signal is increasing or decreasing, respectively.

2. The system of claim 1, wherein the tag is positioned at a geometric center of a side wall of the pan.

3. The system of claim 1, wherein the one or more memory devices further store processor-executable instructions that, when executed, configure the processor to communicate the identifier and the linked information relating to the food carried in the pan in a broadcast message via the network.

4. The system of claim 1, wherein the food preparation apparatus comprises a food holding apparatus having a plurality of holding locations, the food holding apparatus configured to receive the food pan in at least one of the holding locations.

5. The system of claim 4, wherein the one or more tag readers comprise a plurality of antennas, each of the antennas associated with one of the holding locations.

6. The system of claim 4, wherein each of the one or more tag readers is associated with one of the holding locations.

7. The system of claim 6, wherein the one or more memory devices further store processor-executable instructions that, when executed, configure the processor to compare the gain of the tag signal to a threshold for determining when the food pan has arrived at the one of the holding locations associated with the one or more tag readers generating the tag signal.

8. The system of claim 1, wherein the single board computer comprises a Bluetooth Low Energy (BLE) device and the network comprises a Bluetooth mesh network.

9. The system of claim 1, wherein the one or more memory devices further store processor-executable instructions that, when executed, configure the processor to generate a control signal for controlling an operation of the food holding apparatus.

10. The system of claim 9, wherein the single board computer is responsive to the linked information relating to the food carried in the pan in the broadcast message to generate the control signal.

11. The system of claim 9, wherein the food preparation apparatus comprises a touchscreen coupled to the single board computer and configured for interaction with a user thereof and wherein the single board computer is responsive to user input received via the touchscreen to generate the control signal.

12. The system of claim 1, wherein the radio frequency tag comprises at least one of: a passive Radio Frequency Identification (RFID) tag; a battery-free Bluetooth Low Energy (BLE) tag; and a battery-free Near-Field Communication (NFC) tag.

13. A smart pan system comprising:
a food pan configured for carrying food, the food pan having at least one radio frequency tag coupled thereto, the radio frequency tag storing a unique identifier associated with the food pan; and
one or more tag readers configured to read the identifier from the tag and generate a tag signal when the tag is within range thereof, wherein each of the one or more tag readers is associated with a food preparation apparatus communicatively coupled to a wireless network, and wherein the food preparation apparatus is configured to receive the tag signal, the tag signal including the identifier read from the tag by the one or more tag readers, communicate the identifier on the network, link the identifier to information relating to the food carried in the pan, and determine whether the food pan is nearing or leaving the one or more tag readers based on whether a gain of the tag signal is increasing or decreasing, respectively.

14. The system of claim 13, wherein the tag is positioned at a geometric center of a side wall of the pan.

15. The system of claim 13, wherein the food preparation apparatus comprises a food holding apparatus having a plurality of holding locations, the food holding apparatus configured to receive the food pan in at least one of the holding locations, and wherein the one or more tag readers comprise a plurality of antennas, each of the antennas associated with one of the holding locations.

16. The system of claim 13, wherein the food preparation apparatus comprises a food holding apparatus having a plurality of holding locations, the food holding apparatus configured to receive the food pan in at least one of the holding locations, and wherein each of the one or more tag readers is associated with one of the holding locations.

17. The system of claim 16, wherein the food preparation apparatus is further configured to compare the gain of the tag signal to a threshold for determining when the food pan has arrived at the one of the holding locations associated with the one or more tag readers generating the tag signal.

18. The system of claim 13, wherein the radio frequency tag comprises at least one of: a passive Radio Frequency Identification (RFID) tag; a battery-free Bluetooth Low Energy (BLE) tag; and a battery-free Near-Field Communication (NFC) tag.

19. A method comprising:
reading a unique identifier stored on a radio frequency tag, wherein the tag is coupled to a food pan configured for carrying food, and wherein the identifier is read by one or more tag readers associated with one or more food preparation apparatuses when the tag is within range of the one or more tag readers;
receiving a tag signal generated by the one or more tag readers, the tag signal including the identifier read from the tag by the one or more tag readers;
communicating the identifier on a wireless network, wherein the network comprises a plurality of nodes, and wherein the one or more food preparation apparatuses are nodes of the network;
linking the identifier to information relating to the food carried in the pan;
measuring a gain of the tag signal;
determining if the gain of the tag signal is increasing or decreasing; and
determining the food pan is nearing or leaving the one or more tag readers when the gain of the tag signal is increasing or decreasing, respectively.

20. The method of claim 19, further comprising communicating the identifier and the linked information relating to the food carried in the pan in a broadcast message via the network.

21. The method of claim 19, wherein at least one of the food preparation apparatuses comprises a food holding apparatus having a plurality of holding locations, the food holding apparatus configured to receive the food pan in at least one of the holding locations, and further comprising locating at least one of the one or more tag readers in close proximity to each of the plurality of holding locations.

22. The method of claim 19, further comprising generating a control signal for controlling an operation of the one or more food preparation apparatuses.

23. The method of claim 21, further comprising comparing the gain of the tag signal to a threshold and determining when the food pan has arrived at the at least one of the holding locations associated with the one or more tag readers generating the tag signal based on the gain of the tag signal exceeding the threshold.

* * * * *